(12) United States Patent
Feldman et al.

(10) Patent No.: US 10,607,085 B2
(45) Date of Patent: Mar. 31, 2020

(54) AUTOMATICALLY REBROADCASTING VIDEO STREAMS FOR CONFIDENCE REVIEW

(71) Applicant: Disney Enterprises, Inc., Burbank, CA (US)

(72) Inventors: Vladislav Feldman, Manhasset Hills, NY (US); Efthimis Stefanidis, Douglaston, NY (US); Michael J. Strein, Bohemia, NY (US)

(73) Assignee: Disney Enterprises, Inc., Burbank, CA (US)

( * ) Notice: Subject to any disclaimer, the term of this patent is extended or adjusted under 35 U.S.C. 154(b) by 215 days.

(21) Appl. No.: 15/483,852

(22) Filed: Apr. 10, 2017

(65) Prior Publication Data

US 2018/0295165 A1 Oct. 11, 2018

(51) Int. Cl.
*G06F 15/16* (2006.01)
*G06K 9/00* (2006.01)
*H04L 29/06* (2006.01)

(52) U.S. Cl.
CPC ...... *G06K 9/00744* (2013.01); *H04L 65/4076* (2013.01); *H04L 65/604* (2013.01)

(58) Field of Classification Search
CPC ............ G06K 9/00744; H04L 65/4076; H04L 65/604

USPC ......................................................... 709/219
See application file for complete search history.

(56) References Cited

U.S. PATENT DOCUMENTS

| | | | | | |
|---|---|---|---|---|---|
| 5,577,042 | A | * | 11/1996 | McGraw, Sr. | ...... H04L 12/2801 340/2.1 |
| 2014/0304756 | A1 | * | 10/2014 | Fletcher | ............. H04N 21/2387 725/115 |
| 2015/0301781 | A1 | * | 10/2015 | Ekkaia | ................... G06F 3/1446 362/237 |
| 2017/0279760 | A1 | * | 9/2017 | Li | ........................ H04L 41/5009 |

* cited by examiner

*Primary Examiner* — Sm A Rahman
(74) *Attorney, Agent, or Firm* — Farjami & Farjami LLP

(57) ABSTRACT

There is provided a system including an Internet Protocol (IP) switch, a client, a content source, a content monitor, a system manager having a hardware processor and a memory storing a content management software code, wherein the client is communicatively coupled to the IP switch via a network path. The system receives, using the IP switch, a source content stream from the content source, transmits the source content stream to the client via the network path, replicates, at the client, the source content stream to generate a client content stream, sends, from the client, the client content stream via the network path to the content monitor, and compares, using the content monitor, the client content stream with the source content stream.

20 Claims, 3 Drawing Sheets

AUTOMATICALLY REBROADCASTING VIDEO STREAMS FOR CONFIDENCE REVIEW

BACKGROUND

Streaming video media is an ever-increasing driving force in current entertainment media distribution and trends. Streaming Video over Internet Protocol (VIP) creates further quality assurance and quality control challenges for Internet Service Providers (ISPs) in order to satisfy service level agreements. However, in order to ensure service level agreements are met, ISP carriers need to check media transmissions for errors and ensure accurately receiving transmissions.

In the video domain having dedicated video links in a network path for distant devices, there are no ways to loop the transmission back through the network path to the source, thereby providing confidence of the health of the network and that the signal has arrived at the intended destination. Subscribing to the same multicast or requesting delivery of a new unicast only verifies that the source is correct, but does not verify the path to the original desired destination is valid. Other techniques are known, for example port forwarding, however, port forwarding merely provides for video traffic to join the original multi/unicast. Address replication is yet another technique used to provide redundancy in switches, which replicates the traffic across multiple ports and/or switch frames. However, address replication is merely a replication of the original source traffic, and fails to instill full confidence in proper reception of the transmission.

SUMMARY

There are provided systems and methods for automatically rebroadcasting video streams for confidence checking or review, substantially as shown in and/or described in connection with at least one of the figures, as set forth more completely in the claims.

DETAILED DESCRIPTION

Figure 1:
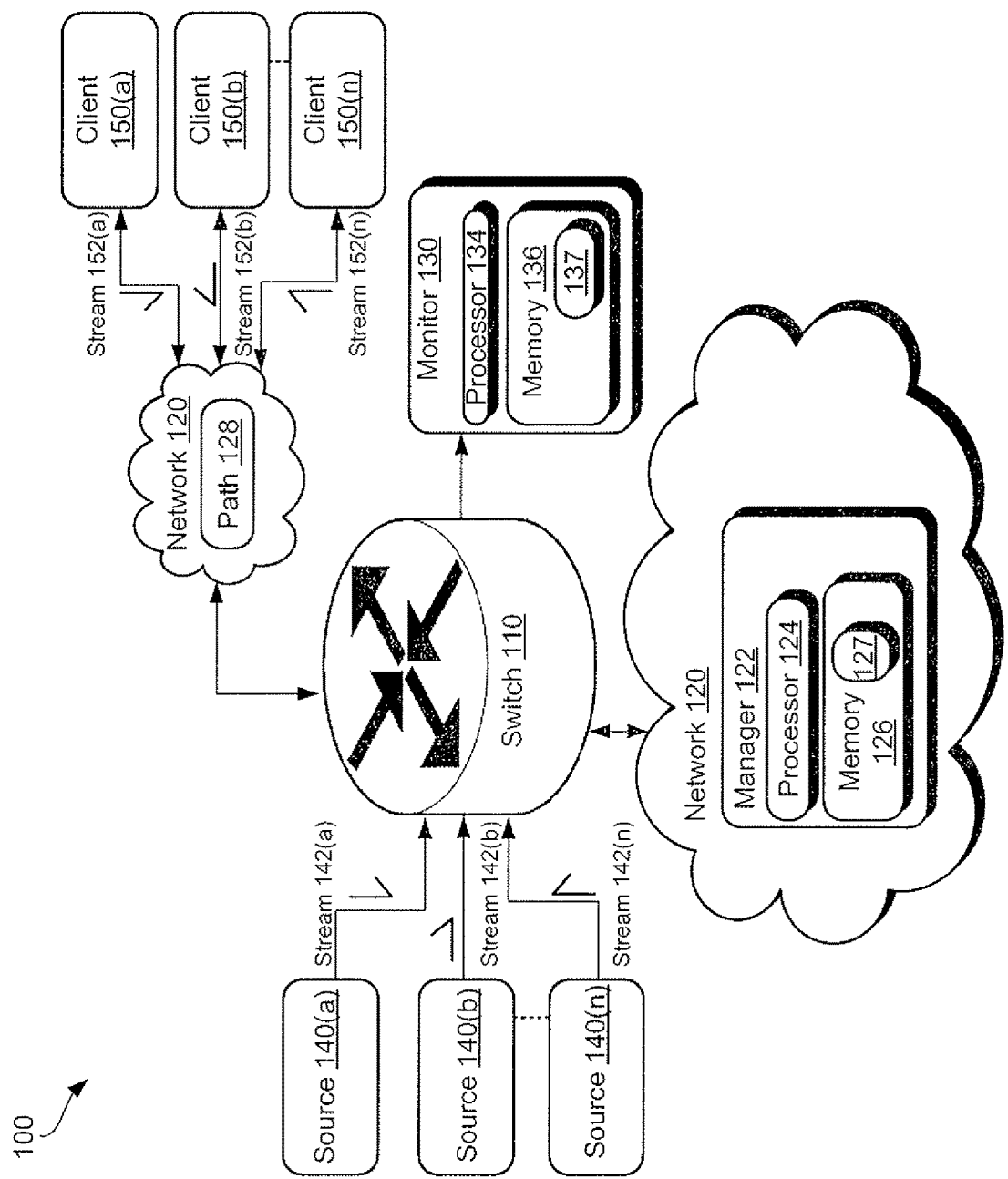
FIG. 1 shows an exemplary Video over Internet Protocol (VIP) system, according to one implementation of the present disclosure.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 depicts an exemplary diagram of Video over Internet Protocol (VIP) system 100 according to one implementation. As shown in FIG. 1, VIP system 100 includes Internet Protocol (IP) switch 110, network 120, content monitor 130, content sources 140(a), and 140(b) through 140(n) (hereinafter "sources 140(a)-(140)(n)"), as well as clients 150(a), and 150(b) through 150(n) (hereinafter "clients 150(a)-150(n)"). Sources 140(a)-(140)(n) provide source content streams 142(a), and 142(b) through 142(n) (hereinafter "source content streams 142(a)-(142(n)") for transmission to clients 150(a)-150(n), via IP switch 110 and network path 128 of network 120. Clients 150(a)-150(n) are configured to transmit client content streams 152(a), 152(b) through 152(n) (hereinafter "client content streams 152(a)-152(n)") to content monitor 130, via network path 128 of network 120 and IP switch 110.

As shown in FIG. 1, content monitor 130 includes monitor processor 134 and monitor memory 136 having monitor software code 137 stored thereon. Monitor processor 134 is configured to execute monitor software code 137 for comparing source content streams 142(a)-142(n) with client content streams 152(a)-152(n), which is described in further detail below.

As shown in FIG. 1, IP switch 110 communicates with clients 150(a)-150(n) and system manager 122 via network 120. Content monitor 130 and sources 140(a)-140(n) are communicatively coupled to IP switch 110 by means other than network 120, for example, a WAN/LAN networked computer system capable of communication with the Internet via wireless or connected communication, e.g. Ethernet hybrid fiber optic cabling system. In yet another exemplary implementation, content monitor 130 and sources 140(a)-140(n) also communicate with IP switch 110 via network 120.

IP switch 110 may further comprise an intelligent switch fabric configured to route a plurality of input data streams to a plurality of output connections. IP switch 110 may include an IP address. In one exemplary implementation, IP switch 110 is configured for routing VIP streams via packet level interaction between multiple protocol layers including a transport layer, network layer, data link layer and physical layer.

As discussed above, VIP streaming requires packet level interaction between multiple protocol layers. IP packets are a well-known implementation of Internet Protocol communication wherein user datagram protocol (UDP) utilizes packets as a means of quantizing data. A brief overview follows.

Initially, a data stream source creates the transport layer and process the video stream by adding a header and sending a packet having modified header information to the network layer. The network layer may also add header information including the source and destination addresses, which forms a network layer packet or IP packet. The IP packet then receives more header information, such as the source and destination addresses and then sends the frame to a physical layer. An IP address contains the network number and host number of every host and router on the Internet, and can be set statically or dynamically via the Dynamic Host Configuration Protocol (DHCP). The physical layer then transmits the frame along the path to another router and the process repeats until the packet arrives to the intended destination. Once the router receives the packet, the router removes the packet header and trailer information from the frame and pass the data stored in the frame's payload, i.e. the packet, to the software for routing the packet determines which port to utilize for sending the packet to the next router on the path to the destination. IP switch 110 may operate in accordance with the preceding protocol.

As shown in FIG. 1, network 120 includes system manager 122, and network path 128. Network path 128 may include a plurality of nodes (not shown in FIG. 1). The plurality of nodes may include switch fabric routers analogous to IP switch 110. System manager 122 includes manager processor 124 and manager memory 126 storing content management software code 127 thereon. Manager processor 124 may include a hardware processor. Manager processor 124 is configured to execute content management software code 127 in order to carry out the methods described herein and control the overall operation of VIP system 100.

In an exemplary implementation, system manager 122 may include a server administrator, and manager processor 124 may include multiple blade servers implemented as an information handling system (IHS). Analogously manager memory 126 may include multiple memory devices implemented via an IHS. In another exemplary implementation, system manager 122 may be implemented as a virtual manager including an orchestration layer residing at a software defined network level (SDNL) of network 120. In another exemplary implementation, system manager 122 may be implemented as a virtual machine having virtual infrastructures in a cloud-based system.

Figure 2:
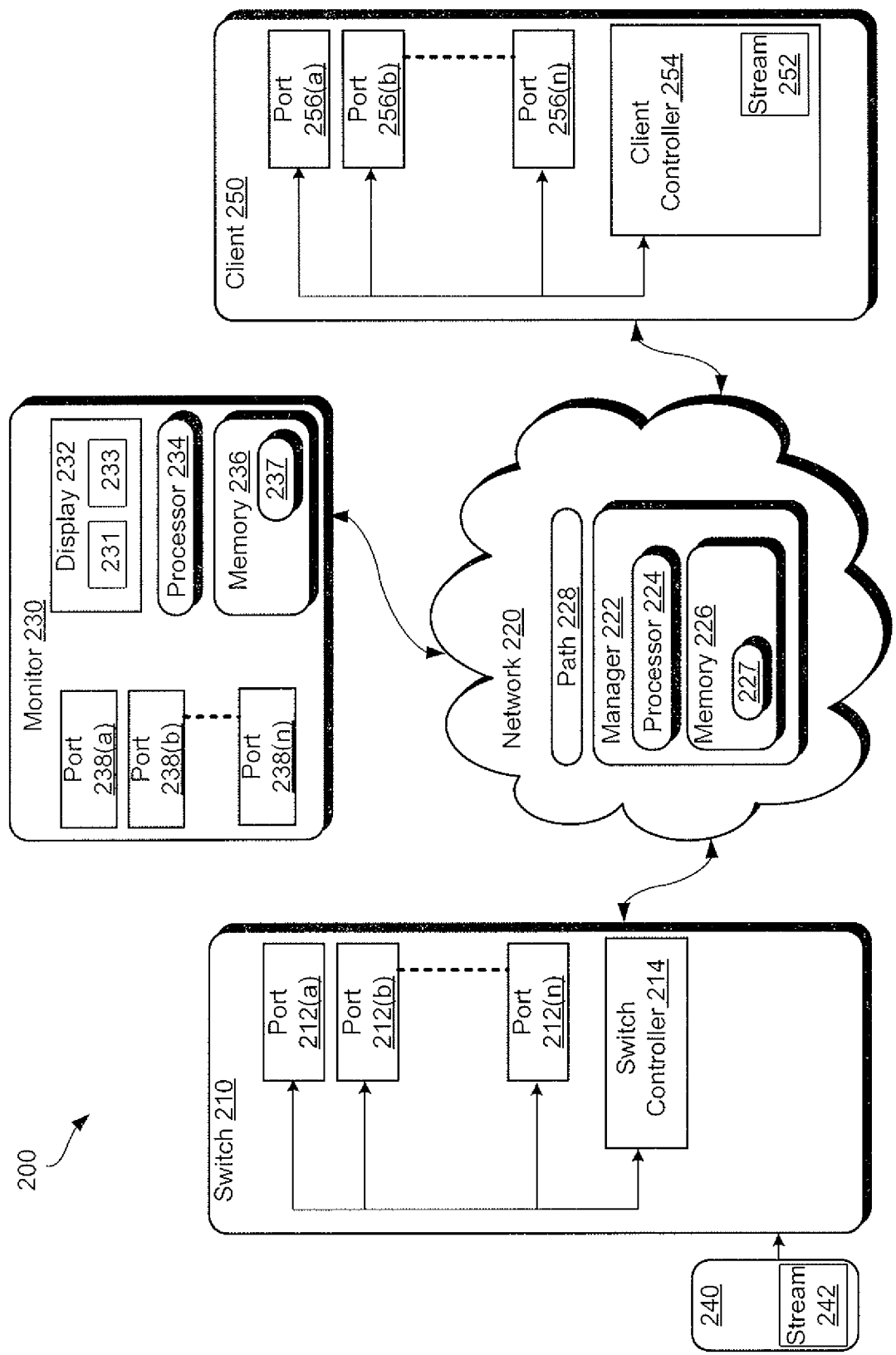
FIG. 2 shows an exemplary implementation of the VIP system of FIG. 1.

Referring now to FIG. 2, FIG. 2 shows VIP system 200, which is an exemplary implementation of VIP system 100 of FIG. 1, wherein similar labels correspond to similar structure having similar operation. As shown in FIG. 2, VIP system 200 includes IP switch 210, network 220, content monitor 230, source 240, and client 250.

As shown in FIG. 2, IP switch 210 includes ports 212(*a*), and 212(*b*) through 212(*n*) (hereinafter "ports 212(*a*)-212(*n*)"), which are communicatively coupled to switch controller 214. IP switch 210 may be configured to receive content stream 242 from source 240. In an exemplary implementation, switch controller 214 may include a field programmable gate array (FPGA) or other hardware processor and storage capable of managing data, i.e. storing IP addresses, and routing connections between source and destination. In a particular implementation, switch controller 214 may include a switch memory having a switching table (not shown in FIG. 2) configured to store information corresponding to port IDs, i.e. IP address, for each port 212(*a*)-212(*n*), and the connected corresponding host, i.e. client 250.

In another exemplary implementation, switch controller 214 may be implemented as a virtual machine having a virtual switching infrastructure, such that the commands to configure the virtual switching infrastructure are externally available for access, for example in a cloud-based system.

Client 250 includes port 256(*a*), and 256(*b*) through 256(*n*) (hereinafter "ports 256(*a*)-256(*n*)"), which are communicatively coupled to client controller 254. Client controller 254 is configured to transmit client content stream 252 to monitor 230 via network 220.

As shown in FIG. 2, network 220 includes network path 228 and system manager 222 having processor 224 and manager memory 226 storing content management software code 227 thereon. In a particular implementation, network path 228 may include a plurality of nodes (not shown in FIG. 2); the plurality of nodes may each be analogous to IP switch 210, i.e. each node having a plurality of node ports and a node controller. Node ports may include either access ports or interconnection ports wherein a port ID identifies access ports and corresponding client 250, and interconnection ports are identified by a different port ID and may be connected to other nodes within network path 220.

Content monitor 230 includes port 238(*a*), 238(*b*) through 238(*n*) (hereinafter "ports 238(*a*)-238(*n*)"), display 232 having a first screen 231 and a second screen 232, monitor processor 234, and monitor memory 236 having monitor software code 237 stored thereon. First screen 231 and second screen 233 may be implemented as a LCD, a notebook computer, or other equivalent methods of displaying video content. In a particular implementation, content monitor 230 is configured to receive client content stream 252 from client 250. Monitor processor 234 may include a hardware processor and may be configured to execute monitor software code 237 in order to perform error and confidence checking or review.

Figure 3:
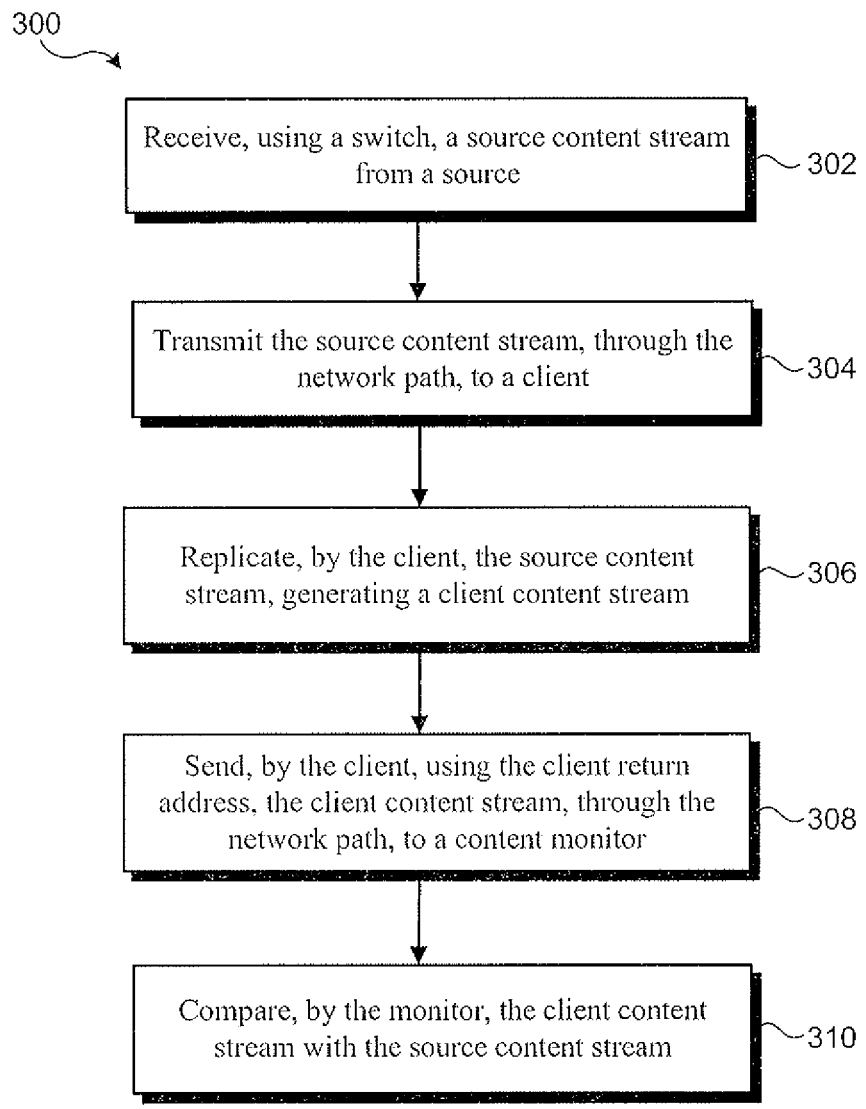
FIG. 3 shows a flowchart presenting an exemplary method for use by the VIP system of FIGS. 1 and 2, according to one implementation of the present disclosure.

Referring now to FIG. 3 in conjunction with FIG. 1 and FIG. 2, FIG. 3 depicts flowchart 300 presenting an exemplary method for use of VIP system 100, 200. Flowchart 300 begins wherein manager processor 124, 224 is configured to execute content management software code 127, 227 causing VIP system 100, 200 to receive, using IP switch 110, source content stream 142(*n*), 242 from source 140(*n*), 240 (action 302). In an exemplary implementation, receiving, using IP switch 110, 210, source content stream 142(*n*), 242 may be in response to a request sent by client 150(*n*), 250, the request corresponding to source content stream 142(*n*), 242 of content source 140(*n*), 240. The request may be sent to system manager 122, 222 via network 120, 220. After receiving the request, system manger 122, 222 may cause manager processor 124, 224 to communicate the request to source 140(*n*), 240. In response to the request, source 140(*n*), 240 may provide source content stream 142(*n*), 242 for transmission to the requesting client 150(*n*), 250, and thereafter performing action 302 as discussed above.

Flowchart 300 continues wherein IP switch 110, 210 is configured to transmit source content stream 142(*n*), 242, through network path 128, 228 to client 150(*n*), 250 (action 304). In an exemplary implementation, prior to transmitting source content stream 142(*n*), 242, system manager 122, 222 may be configured to cause IP switch 110, 210 to modify source content stream 142(*n*), 242 by reserving a client return address for use by client 150(*n*), 250. In this implementation, source content stream 142(*n*), 242 may include a packet, as previously discussed, and prior to transmitting source content stream 142(*n*), 242, manager processor 124, 224 of system manager 122, 222 is further configured to execute content manager software code 127, 227 to modify to modify source content stream 142(*n*), 242 by reserving a client return address in the packet.

Next, method 300 continues wherein system manager 122, 222 is configured to cause client 150(*n*), 250 to replicate, by client 150(*n*), 250, source content stream 142(*n*), 242, generating client content stream 152(*n*), 252 (action 306). In one particular implementation, generating client content stream 152(*n*), 252 may include altering source content stream 142(*n*), 242 by augmenting with further graphics and information. After generating client content stream 152(*n*) 252 as described above, flowchart 300 continues to send, by client 150(*n*), 250, using the client return address, client content stream 152(*n*), 252, through network path 128, 228, to content monitor 130, 230 (action 308).

In an exemplary implementation, sending, by client 150(*n*), 250, using the client return address, client content stream 152(*n*), 252, through network path 128, 228, to content monitor 130, 230 further comprises sending the packet utilizing the client return address.

As discussed above, content monitor 130, 230 is configured to perform error checking and confidence checking of client content stream 152(*n*), 252 by comparing with source content stream 142(*n*), 242. Accordingly, system 100, 200 is configured to next compare, by content monitor 130, 230 client content stream 152(*n*), 252 with source content stream 142(*n*), 242 (action 310). Content monitor 130, 230 may be configured to receive source content stream 142(*n*), 242 from source 140(*n*), 240, via IP switch 110, 210.

In an exemplary implementation, monitor processor 134, 234 executes monitor software code 137, 237 on monitor memory 146, 246 for comparing client content stream 152(*n*), 252 with source content stream 142(*n*), 242 via first screen 231 and second screen 233 of display 232.

In an exemplary implementation, first screen 231 corresponds to source content stream 142(*n*), 242 and second screen 233 corresponds to client content stream 152(*n*), 252. Comparing client content stream 152(*n*), 252 with source content stream 142(*n*), 242 includes utilizing first screen 231 and second screen 233 to perform a visual comparison of source content stream 142(*n*), 242 and client content stream 152(*n*), 252. A system administrator (not shown), for example a human user observing and comparing first and second screens 231, 233, may perform the visual comparison.

In another exemplary implementation, comparing, using content monitor 130, 230, client content stream 152(*n*), 252 with source content stream 142(*n*), 252 further comprises performing at least one of: error checking, forward error correction, source address verification, validation of error checking, compressed and uncompressed checking, and other methods of validating compressed and uncompressed circuits known in the art. Monitor processor 134, 234 may be configured to execute monitor software code 137, 237 to provide error checking and validation as described above.

In yet another exemplary implementation, monitor processor 134, 234 is configured to execute image recognition software stored on monitor memory 236 to perform, by content monitor 130, 230, a visual comparison utilizing image recognition software. Upon recognizing an error, monitor processor 134, 234 is further configured to send, to system manager 122, 222, an alert (not shown). Image recognition software may be included with monitor software code 137, 237 and may be configured to provide real time error messages to system manager 122, 222 upon recognizing an error in client content stream 152(*n*), 252. Real time error messages may include an alert based on the type or frequency of detected error. The real time error message may include a location of the error in client content stream 152(*n*), 252. In a particular implementation, the image recognition software may be configured for transmitting various alerts based on the type of detected error. For example, an urgent error alert may be sent if more than a predetermined threshold number of errors are detected within a predetermined amount of time, i.e. high error frequency.

Source confidence checking provides ensuring the intended client 150(*n*), 250 received the correct source content stream 142(*n*), 242. As discussed in FIG. 2, IP switch 210 includes ports 212(*a*)-212(*n*) and switch controller 214, client 250 includes ports 256(*a*)-256(*n*) and client controller 252, and content monitor 230 includes ports 238(*a*)-238(*n*). Network path 228 may include a plurality of nodes; nodes may include switch fabric routers analogous to IP switch 110, 210.

In an exemplary implementation, system manager 122, 222 controls IP switch 110, 220, client 150(*a*)-150(*n*), 250, the plurality of nodes of network path 122, 222, and content monitor 230. System manager 222 manages routing source content streams 142(*a*)-142(*n*), 242 and client content streams 152(*a*)-152(*n*), 252 between the plurality of nodes, ports 212(*a*)-212(*n*), ports 256(*a*)-256(*n*), and ports 238(*a*)-238(*n*) of IP switch 110, 210, client 150(*a*)-150(*n*), 250, and content monitor 130, 230, respectively. In an exemplary implementation managing routing for ports includes at least one of modifying a client IP address, creating a virtual port, or reassigning a connection between ports 212(*a*)-212(*n*), ports 256(*a*)-256(*n*), and ports 238(*a*)-238(*n*).

In an exemplary implementation, network path 128, 228 comprises a plurality of long haul transmission links (not shown) and client 150(*n*), 250 is located in a remote location. System manager 122, 222 may execute content management software code 127, 227 for maintaining the longest route in network path 128, 228. As is well known in the art, sending VIP over long haul transmission links requires one or more intermediary links, i.e. the plurality of nodes. Generally, the links are intelligent and strive to achieve the shortest route between the source and destination. However, an exemplary implementation provides dynamically managing sources 140(*a*)-140(*n*), 240, clients 150(*a*)-150(*n*), 250, and the plurality of nodes to provide the longest route, rather than a shorter, e.g., more efficient, route.

In a particular implementation, system manager 122, 222 dynamically manages the plurality of nodes of network path 128, 228 by causing IP switch 110, 210 and the plurality of nodes of network path 128, 228 to preserve packet IP addresses through the plurality of nodes wherein packet data corresponding to node IP addresses are not overwritten in order to return a packet through the same path taken by source content stream 142(*n*), 242. Dynamically managing network path 128, 228 in this manner ensures the whole round trip path is preserved, providing confidence that the path is correct. Accordingly, system manager 122, 222 controls the whole path of network path 128, 228 including the plurality of nodes. By comparing what was sent, i.e. source content stream 142(*n*), 242, to what was received, i.e. client content stream 152(*n*), 252, an administrator has confidence the path is correct.

In an exemplary implementation, source 140(*n*), 240 may be TV stations that stream video content to multiple client destinations in a plurality of long distance remote locations. Client 150(*n*), 250 may modify source content stream 142(*n*), 242 by including logos for local stations and the like, thereby generating client content stream 152(*n*), 252, as discussed above. Therefore, client content stream 152(*n*), 252 may include logos not included on source content stream 142(*n*), 242. An administrator or the image recognition software can monitor display 232 and perform both a visual comparison ensuring sufficient content quality, while also ensuring the correct source 140(*n*), 240 was sent to, and received by, the correct client 150(*n*), 250 and that network path 128, 228 is sufficiently operable.

From the above description it is manifest that various techniques can be used for implementing the concepts described in the present application without departing from the scope of those concepts. Moreover, while the concepts have been described with specific reference to certain implementations, a person of ordinary skill in the art would recognize that changes could be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   an Internet Protocol (IP) switch;
   a client communicatively coupled to the IP switch via a network path;
   a content source;
   a content monitor;
   a system manager having a hardware processor and a memory storing a content management software code, wherein the hardware processor is configured to execute the content management software code to:
      receive, using the IP switch, a source content video stream from the content source; and
      transmit the source content video stream to the client via the network path;
   wherein the client is configured to:
      replicate, at the client, the source content video stream to generate a client content video stream; and
      send, from the client, the client content video stream to the content monitor via the network path;
   wherein the content monitor is configured to:
      compare the client content video stream with the source content video stream;
      determine an error based on comparing the client content video stream with the source content video stream; and
      send, in response to determining the error, an alert to the system manager.

2. The system of claim 1, wherein the content monitor comprises a display, the display comprising a first screen and a second screen, and wherein comparing the client content video stream with the source content video stream further comprises utilizing the first screen and the second screen to perform a visual comparison of the source content video stream and the client content video stream.

3. The system of claim 1, wherein the content monitor comprises a monitor processor and a monitor memory having a monitor software code, and wherein the monitor processor is configured to execute the monitor software code to:
   perform, by the content monitor, the compare utilizing an image recognition software to determine the error.

4. The system of claim 1, wherein comparing, using the content monitor, the client content video stream with the source content video stream further comprises performing at least one of: error checking, forward error correction, source address verification, validation of error checking, compressed checking or uncompressed checking.

5. The system of claim 1, wherein the source content video stream comprises a packet, and wherein, prior to transmitting the source content video stream, the hardware processor of the system manager is further configured to execute the content management software code to modify the source content video stream by reserving a client return address in the packet.

6. The system of claim 5, wherein sending, using the client, the client content video stream to the content monitor via the network path further comprises sending the packet utilizing the client return address.

7. The system of claim 1, wherein the IP switch comprises a first plurality of ports, wherein the client comprises a client IP switch having a second plurality of ports, and wherein the content monitor comprises a third plurality of ports.

8. The system of claim 7, wherein the network path comprises a plurality of nodes, and wherein the system manager manages routing connections between the plurality of nodes, the first plurality of ports, the second plurality of ports, and the third plurality of ports.

9. The system of claim 8, wherein the system manager resides at a software defined network level (SDNL) of the network.

10. The system of claim 8, wherein managing of the routing connections further comprises one or more of modifying a client IP address, creating a virtual port, or reassigning connections between the plurality of nodes, the first plurality of ports, the second plurality of ports, and the third plurality of ports.

11. A method for use by a system including an Internet Protocol (IP) switch, a client, a content source, a content monitor, a system manager having a hardware processor and a memory storing a content management software code, wherein the client is communicatively coupled to the IP switch via a network path, the method comprising:
   receiving, using the IP switch, a source content video stream from the content source;
   transmitting the source content video stream to the client via the network path;
   replicating, at the client, the source content video stream to generate a client content video stream;
   sending, from the client, the client content video stream via the network path to the content monitor;
   comparing, using the content monitor, the client content video stream with the source content video stream;
   determining, using the content monitor, an error based on comparing the client content video stream with the source content video stream; and
   sending, using the content monitor and in response to determining the error, an alert to the system manager.

12. The method of claim 11, wherein the content monitor comprises a display, the display comprising a first screen and a second screen, and wherein comparing, using the content monitor, the client content video stream with the source content video stream comprises utilizing the first screen and the second screen to perform a visual comparison of the source content video stream and the client content video stream.

13. The method of claim 11, wherein:
   the comparing by the content monitor utilizes an image recognition software for determining the error.

14. The method of claim 11, wherein the comparing comprises performing at least one of: error checking, forward error correction, source address verification, validation of error checking, compressed checking or uncompressed checking.

15. The method of claim 11, wherein the source content video stream comprises a packet, and wherein, prior to transmitting the source content video stream, the method further comprising:
   modifying the source content video stream by reserving a client return address in the packet.

16. The method of claim 15, wherein the sending comprises sending the packet utilizing the client return address.

17. The method of claim 11, wherein the IP switch comprises a first plurality of ports, wherein the client comprises a client IP switch having a second plurality of ports, and wherein the content monitor comprises a third plurality of ports.

18. The method of claim 17, wherein the network path comprises a plurality of nodes, and wherein the system manager manages routing connections between the plurality of nodes, the first plurality of ports, the second plurality of ports, and the third plurality of ports.

19. The method of claim 18, wherein the system manager resides at a software defined network level (SDNL) of the network.

20. The method of claim 18, wherein managing routing connections further comprises one or more of modifying a client IP address, creating a virtual port, or reassigning connections between the plurality of nodes, the first plurality of ports, the second plurality of ports, and the third plurality of ports.

* * * * *